United States Patent [19]

Petrin et al.

[11] Patent Number: 5,057,236

[45] Date of Patent: Oct. 15, 1991

[54] SURFACTANT ION PAIR FLUORESCENT WHITENER COMPOSITIONS

[75] Inventors: Michael Petrin, Pleasanton; Gregory van Buskirk, Danville, both of Calif.

[73] Assignee: The Clorox Company, Oakland, Calif.

[21] Appl. No.: 540,975

[22] Filed: Jun. 20, 1990

[51] Int. Cl.$^5$ ........................ C09K 13/00; C11D 7/54; C11D 7/60

[52] U.S. Cl. .................................. 252/79.1; 252/547; 252/548; 252/8.8; 252/135; 252/174.21; 252/91; 252/96; 252/98; 106/414

[58] Field of Search ................ 252/547, 548, 8.8, 135, 252/174.21, 91, 96, 98, 79.1; 106/414

[56] References Cited

U.S. PATENT DOCUMENTS

| | | | |
|---|---|---|---|
| 3,951,960 | 4/1976 | Heath | 252/98 |
| 3,962,121 | 6/1976 | Takaku | 252/8.8 |
| 4,028,263 | 6/1977 | Gray | 252/96 |
| 4,462,804 | 7/1984 | Gangwisch | 252/91 |
| 4,559,169 | 12/1985 | Wevers | 252/174.21 |
| 4,708,816 | 11/1987 | Chang | 106/414 |
| 4,795,573 | 1/1989 | Tsumadori | 252/8.8 |
| 4,806,255 | 2/1989 | Konig | 252/8.8 |
| 4,806,260 | 2/1989 | Broze | 232/135 |
| 4,844,823 | 7/1989 | Jacques | 252/8.8 |
| 4,851,138 | 7/1989 | Jaroschek | 252/8.8 |

*Primary Examiner*—Paul Lieberman
*Assistant Examiner*—Kevin D. McCarthy
*Attorney, Agent, or Firm*—Harry A. Pacini

[57] ABSTRACT

Optical brighteners (fluorescent whitener agents) can be made hypochlorite bleach resistant, stable and formulated into concentrated aqueous hypochlorite solutions and into detergent compositions in a manner whereby the whitener agent is transformed into a neutral ion-pair with a surface active quaternary ammonium ion-producing compound.

14 Claims, No Drawings

SURFACTANT ION PAIR FLUORESCENT WHITENER COMPOSITIONS

This invention relates to surfactant ion-pair fluorescent whitening compositions which possess enhanced aqueous hypochlorite bleach stability.

BACKGROUND OF THE INVENTION

Optical brighteners are dyes which are deposited onto fabrics and impart to the fabric an added increment of whiteness/brightness by means of their ability to absorb invisible ultraviolet radiation and re-emit it as visible radiation. Optical brighteners, also known as fluorescent whitener agents, have found widespread use as components of household detergent compositions, including also laundry boosters and fabric softeners.

Sodium hypochlorite is a highly effective bleaching agent and has long been used in conjunction with soaps and detergents to remove stains and other types of soils in the laundering of fabrics. It is generally formulated at a concentration of about 3–8% in water for sale for household use, where it is typically diluted to a concentration of about 200 parts per million (ppm) sodium hypochlorite for laundry bleaching.

To achieve the degree of whiteness desired in the wash by most customers, a combination of bleaching and optical brightening is generally required. This requirement usually is met by using an active fluorescent whitener or fluorescent whitener agent-containing detergent composition as the primary washing agent, combined with a subsequent addition of hypochlorite bleach in a separate step. Thus in order to achieve both bleaching and brightening, a consumer would usually need to use an active, fluorescent whitener agent-containing detergent composition as the primary washing agent, combined with a subsequent addition of hypochlorite bleach to the wash water, or prior to use thereof the addition of a hypochlorite bleach in a separate step. Additionally, the use of a hypochlorite bleach containing fluorescent whitener agents would be advantageous.

Optical brighteners or fluorescent whitener agents are generally insoluble and/or unstable in concentrated hypochlorite, and tend to quickly settle to the bottom of an aqueous hypochlorite solution. In other instances, simple addition of optical brighteners to concentrated aqueous hypochlorite results in a product which must be vigorously shaken each time before use in order to intersperse and mix the ingredients. Because of the tendency for rapid settling, even vigorous shaking before each use does not always result in obtaining a uniform proportion of fluorescent whitener agent and hypochlorite in each use thereof. Further, optical brighteners are known in some instances to be quickly and irreversibly decomposed in the presence of sodium hypochlorite bleach, even at concentrations well below 200 ppm sodium hypochlorite.

It has long been deemed desirable to consolidate bleaching/brightening effects into a single-step process. This could be accomplished by formulating detergents with bleach-stable optical brighteners. Thus in opposition to using subsequent addition of hypochlorite bleach in separate steps with the use of optical brighteners, a detergent which contains an optical brightener which is stable to sodium hypochlorite will still achieve a fabric brightening effect in spite of simultaneous use of the detergent and the sodium hypochlorite.

Another means to consolidate bleaching and brightening into a single-step process is to formulate concentrated (typically about 3–8%) sodium hypochlorite solutions which contain bleach-stable brighteners. Thus both bleaching and brightening can be ensured without regard to the detergent used by the consumer. However, as noted above, optical brighteners are generally unstable in the presence of sodium hypochlorite bleach.

There have been previous attempts to stabilize optical brighteners against reaction with sodium hypochlorite and/or to achieve successful dispersions of optical brighteners in aqueous sodium hypochlorite solutions. For example, U.S. Pat. No. 3,393,153 attempts to present a solution to the problem by including in the composition a particulate material such as colloidal silica or a particulate colloidal polymeric resin which keeps the optical brightener in suspension in aqueous hypochlorite. U.S. Pat. No. 3,393,153 describes an optical brightener/hypochlorite bleach composition, where because of the tendency of rapid settling, even with vigorous shaking before its use, the composition does not necessarily result in obtaining a uniformly proportioned optical brightener and hypochlorite composition.

U.S. Pat. No. 4,526,700 is directed to the formulation of aqueous sodium hypochlorite compositions containing a fine dispersion of a bleach-stable optical brightener. The compositions comprise sodium hypochlorite, the optical brightener 4,4′-bis(4-phenyl-2H-1,2,3-triazol-2-yl)-2,2′-stilbenedisulfonate, certain alkylaryl sulfonate surfactants, and water. The optical brightener is present in the composition in the form of a dispersion of fibrous particles. However, these types of composition's are purportedly stabilized by anionic surfactants, not cationic surfactants. This patent shows a two-phase liquid in which the fluorescent whitener agents are resuspended by shaking before use.

U.S. Pat. No. 4,552,680 is directed to aqueous hypochlorite bleach compositions containing hypochlorite stable surfactants and anti-foaming agents.

U.S. Pat. No. 4,790,953 relates to liquid hypochlorite bleach containing optical brighteners solubilized by amine oxides. These provide a substantially clear and stable aqueous sodium hypochlorite brightener solution.

Many previous attempts to create a stable, practical and useful aqueous bleach product containing both hypochlorite bleach and a fluorescent: whitener agent or optical brightener have failed because of brightener/bleach incompatibility. That is, the efficacy of the optical brightener is destroyed by the bleach and/or some of the oxidizing power of the bleach is reduced by the optical brightener.

In accordance with the present invention, it has been found that anionic optical brighteners (fluorescent whitener agents) or their salts can be made hypochlorite bleach-stable and formula&ed into aqueous sodium hypochlorite solutions or into detergent compositions, in a manner whereby said brightener is transformed into a neutral ion pair with a surface-active quaternary ammonium ion-producing compound. These ion pairs, in which the cationic and anionic portions are in at least relative stoichiometric relationship, form stable aqueous dispersions and remain stable in bleach solutions of varying strengths.

SUMMARY OF THE INVENTION

The compositions of the present invention relate to complexation of anionic fluorescent whitener agents with a stoichiometric ratio of cationic surface-active agents (such as quaternary surfactants) to produce neutral ion-paired salts. These neutral ion-paired salts exhibit the dual nature of the original fluorescent brightener and the surface-active agent and impart desired properties of each to the final composition. Unique properties have been observed for these surfactant ion-paired fluorescent whitener agents which include controlled hydrophobicity, high surface activity and good dispersibility.

Therefore, the present invention relates to hypochlorite bleach stable, surface-active fluorescent whitener compositions comprising (a) by weight of about 0.001% to about 5.0% of a suitable sulfonated anionic fluorescent whitener agent; and (b) at least a stoichiometric amount of a cationic non-softening N-higher alkyl, N,N,N-lower alkylammonium, ion-producing surface-active agent.

Since stoichiometry is based on the charge relationship of the ingredients, it is required that the ratio of cationic surfactant to fluorescent whitener agent is greater than or equal to 1. For example, with a disulfonic acid fluorescent whitener agent, a 2:1 ratio of quaternary surfactant to fluorescent whitener agent is necessary. Partial benefits can be obtained by using lesser amounts of reagents. Preferably, the amount of quaternary agent should be equal to or greater than the amount of the fluorescent whitener agent to achieve an overall neutral composition. However, an excess of quaternary surfactant is acceptable. Particularly preferred are disulfonated stilbene fluorescent whitener agents.

DESCRIPTION OF THE INVENTION

In accordance with the present invention, it has been found that anionic optical brighteners (fluorescent whitener agents) or their salts can be made hypochlorite bleach stable and formulated into aqueous sodium hypochlorite laundry additives or into solutions of detergent formulations, in a manner whereby said brighteners are transformed into neutral ion pairs with a surface active quaternary ammonium ion-producing compound. These ion pairs, in which the cationic and anionic portions are in at least relative stoichiometric relationship as described above, form stable dispersions and remain stable in bleach solutions of varying strengths.

(a) a mono- or polysulfonated distyryl-biphenyl or the salts thereof; a mono- or polysulfonated triazinyl amino stilbene or the salts thereof; mono- or polysulfonated triazoyl stilbene or the salts thereof; mono- or polysulfonated naphthotriazolyl or salts thereof; or combinations thereof; and (b) an N-higher alkyl, N,N,N-lower alkylammonium ion; wherein the N-higher alkyl, N,N,N-lower alkylammonium ion and fluorescent whitener agent are present in an ion-pair in at least a stoichiometric ratio based on the fluorescent whitener agent.

The fluorescent whitener agents herein are of the type:

1) DSBP brighteners of the class (mono- or polysulfonated) distyryl-biphenyls

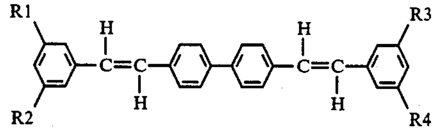

wherein R2, R3 and R4 are independently selected from the substituents: —H, $-SO_3H$, $-SO_3^-M^+$, —CN, —Cl, $-OCH_3$,

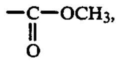, $-SO_2-N(alkyl)_2$, and 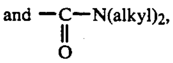, wherein the alkyl group contains from 1 to 8 carbon atoms, inclusive, and wherein M is H, Na, K or Li; and combinations of any of these substituents, provided that at least one of R1, R2, R3 or R4 is $-SO_3^-M^+$, for example

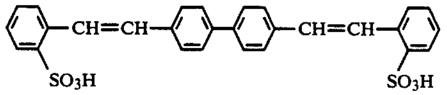

This fluorescent whitener agent or the salts thereof are available from Ciba-Geigy, Toms River, N.J., under the name Tinopal CBS-X.

2) CC/DAS brighteners of the class (mono- or polysulfonated) phenyl-, triazinyl stilbenes,

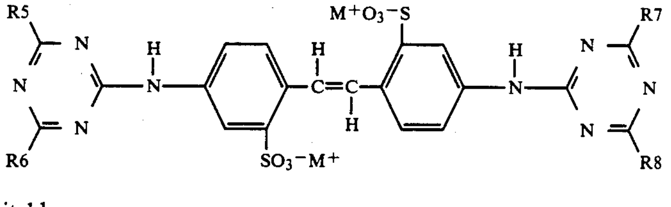

The stabilized compositions of this invention suitable for use in the presence of solutions containing hypochlorite range from about 0.001% to about 20%-sodium hypochlorite; and from about 0.001% to about 5.0% hypochlorite bleach-compatible surface-active ion pair fluorescent whitener composition as hereinafter defined. The essential ingredients of the invention, as well as optional components, can desirably be incorporated in the compositions of this invention as described hereinafter.

The preferred hypochlorite bleach stabilized fluorescent whitener agent composition comprises:

wherein M is H, Na, K or Li; and each of R5, R6, R7 and R8 are independently selected from the substituents:

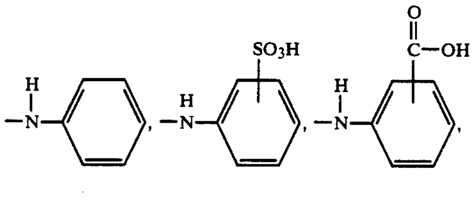

-continued

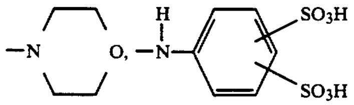

$-NH-(CH_2)_{2-3}-OCH_3$,

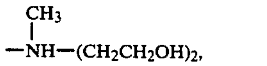

$-Cl$, $-H$, $-NH-CH_2-CH_2-OH$, $-NH_2$, $-OCH_3$, $-NH-CH_2-SO_3H$, $-NH-CH_2-CH_2-OH$, $-N(alkyl)_2$ and $-NH-alkyl$ wherein the alkyl group contains from 1 to about 8 carbon atoms, for example

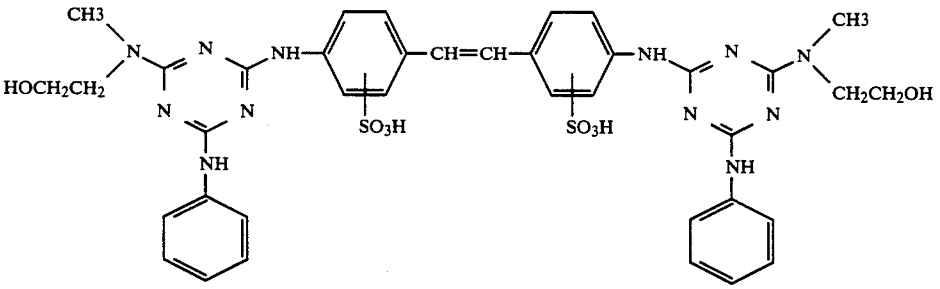

This fluorescent whitener agent or the salts thereof are also available from Ciba-Geigy, under the name Tinopal 5-BMX. Other substituted salts also are available from Mobay, under the name Blankophor RKH.

3) Brighteners of the class mono- or polysulfonated triazolyl stilbenes represented by the formula

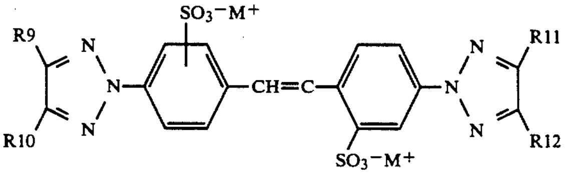

wherein M can be H, Na, K, or Li; R9, R10, R11 and R12 are independently selected from the group consisting of $-H$, $-Cl$, $-NH-CH_3$, $-N(CH_3)_2$, $-SO_3H$, $-SO_2-NH_2$, $-SO_3^-M^+$, $-SO_2-O-C_6H_5$, $-OCH_3$, $-CN$, $-SO_2-N(alkyl)_2$ and

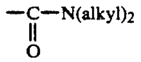

wherein the alkyl group contains from 1 to 8 carbon atoms, and phenyl; for example, 4,4'-bis(v-triazol-2-yl)-stilbene-2,2'-disulfonic acid, its salts and derivatives. This fluorescent whitener agent or its salts and derivatives is available from Mobay, Union, N.J. under the name Blankophor BHC.

4) Brighteners of the class sulfonated naphthotriazolyl stilbene represented by the formula

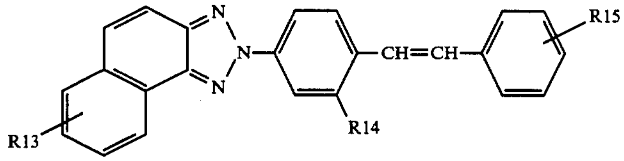

wherein R13 is selected from the group consisting of $-H$, $-SO_3H$, $-SO_3^-M^+$, $-CN$, $-Cl$, $-OCH_3$, $-NH-CH_3$, $-N(CH_3)_2$, $-N(alkyl)_2$, $-SO_2-NH_2$, $-SO_2-O-C_6H_5$,

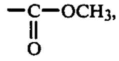 $-SO_2-N(alkyl)_2$ and 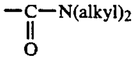

wherein the alkyl group contains from 1 to 8 carbon atoms, inclusive; R14 is selected from the group consisting of $-H$, $-SO_3H$, $-SO_2-NH_2$, $-SO_2-OC_6H_5$ and $-CN$; and R15 is selected from the group consisting of $-H$, $-SO_3H$ and $-OCH_3$ and wherein M is H, Na, K or Li; and combinations of any of these substituents, provided that at least one of R13, R14 or R15 is $-SO_3^-M^+$, for example

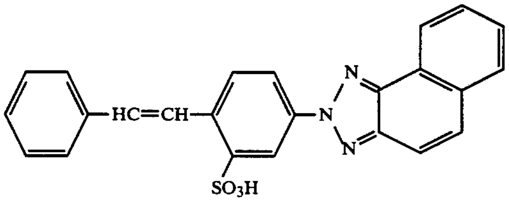

This fluorescent whitener agent or its salts and derivatives is available from Ciba-Geigy, under the name Tinopal RBS.

Although Tinopal CBS-X, Tinopal 5-BMX, Blankophor BHC, and RKH, and their ion pair derivatives have been used as exemplary of fluorescent whitener agents in the surfactant ion-pair fluorescent whitener compositions, ion-pair formation will occur between any charged fluorescent whitener agent (either anionic or cationic) and an oppositely charged surfactant molecule. Formation of similar aggregated ion-pairs can be evidenced spectroscopically. It is to be understood that variations may result in various properties of the resulting ion pair. For example, variations in solubility, spectral changes, degree of hypochlorite resistance and the like.

The fluorescent whitener agent is present in the compositions of the invention at levels from about 0.001% to about 5.0% by weight, preferably from about 0.01% to about 1.0%, and most preferably from about 0.01% to about 0.5%. The surfactants are the type N-higher alkyl, N,N,N-lower alkylammonium salts wherein.. X =anionic counterion, e.g., chloride, bromide, hydroxide, and the like). By the term "higher alkyl" is meant those alkyl groups having from about 8 to about 18 carbon atoms. By the term "lower alkyl" is meant those alkyl groups having from about 1 to about 4 carbon atoms. Other surfactants in the present invention can be selected from the group consisting of the quaternary ammonium, (i.e., N-higher alkyl, N,N,N-lower alkyl ammonium) ion-producing compounds having the following molecular structures:

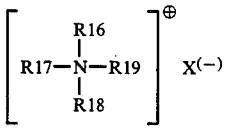

wherein at least one of R16, R17, R18 and R19 is selected from $C_8$–$C_{18}$ saturated alkyl groups. The remainder of R16, R17, R18 and R19 are selected from any combination of the group consisting of $C_1$–$C_4$ saturated alkyl (wherein $C_n$ is $-(CH_2)_{n-1}CH_3$), —H, and phenyl, and $X^-$ is a water-soluble salt-forming anion selected from the group consisting of $Cl^-$, $Br^-$, $OH^-$ and $CN^-$ and the like.

An example of the most preferable formulations of fluorescent whitener agent (FWA) and quaternary surfactant are represented in the following table.

| | | Quaternary Ammonium Compound | | | | |
|---|---|---|---|---|---|---|
| FWA | $SO_3$[a] | R17 | R18 | R19 | R16* | $X^-$ |
| Tinopal CBS-X | 2 | $CH_3$— | $CH_3$— | $CH_3$— | ($C_{10}$ to $C_{18}$) | $Cl^-$ or $Br^-$ or $OH^-$ |
| Tinopal 5-BMX | 2 | $CH_3$— | $CH_3$— | $CH_3$— | ($C_{10}$ to $C_{18}$) | $Cl^-$ or $Br^-$ or $OH^-$ |
| Mobay RKH | 2 | $CH_3$— | $CH_3$— | $CH_3$— | ($C_{10}$ to $C_{18}$) | $Cl^-$ or $Br^-$ or $OH^-$ |
| Blankophor BHC | 2 | $CH_3$— | $CH_3$— | $CH_3$— | ($C_{10}$ to $C_{18}$) | $Cl^-$ or $Br^-$ or $OH^-$ |

[a]Number of $SO_3$ groups in fluorescent whitener agent
*$C_{10}$, $C_{12}$, $C_{14}$, $C_{16}$ and $C_{18}$, where $C_n$ is $-(CH_2)_{n-1}CH_3$.

These complexes subsequently can be used in laundry detergents, laundry additives, or in solutions of sodium hypochlorite. Typically, sodium hypochlorite is commercially formulated in aqueous solutions having a concentration of from about 5% to about 15%. These solutions typically contain an equimolar amount of sodium chloride. In one embodiment of this invention for making the compositions of the present invention it is generally desirable to add sodium hypochlorite solution to the brightener/surfactant solution in volumes such that the volume of sodium hypochlorite will be from about 0.5 to about 8 times the volume of the brightener/surfactant solution. Accordingly, the aqueous sodium hypochlorite source chosen for preparing a composition of the invention should be one which has a sodium hypochlorite concentration such that it can be mixed with the aqueous brightener/surfactant solution within these volume proportions to produce the desired amounts of sodium hypochlorite, brightener and surfactant in the finished product. Sodium hypochlorite is present in the compositions of the invention at levels of from about 0.001% to about 20%, preferably from about 3% to about 8%, more preferably from about 4% to about 7%.

It is understood that in another embodiment of this invention the stabilized composition of brightener and surfactant can be prepared and used by addition to a second solution (1) containing hypochlorite or (2) that contain hypochlorite added after the brightener/surfactant composition is added thereto.

Another suitable method of preparing stable encapsulated ion-pair brightener agents of this invention for delivery to and for treating fabrics can be found in U.S. Pat. No. 4,708,816, which is hereby incorporated by reference. U.S. Pat. No. 4,708,816 discloses microcapsules useful as whitener agents for fabrics, in which the capsules have a controlled density distribution which are dispersed in aqueous hypochlorite bleaching solutions. The general method comprises dispersing a quantity of particles to be encapsulated in an aqueous solution and adding sufficient polymer, such as ethylene derived hydrocarbon polymers, in the presence of a suitable surfactant to form an emulsion, adjusting the temperature, and admixing a coagulating agent into the emulsified solution while maintaining the temperature to within a desired range.

Various additional ingredients have been found to be desirable for addition to such compositions and then preferably mixed into the solution of brightener and surfactant prior to the addition of the aqueous sodium hypochlorite to the solution. If a fragrance is used, the amount is in the upper end of the range of 0.3% to 0.5%. Oftentimes organic oils are also used in order to mask the chlorine smell from the hypochlorite solution. A preferred organic oil is a derivatized linear alkylbenzene having alkyl chains from 10 to 14 carbon atoms. Other ingredients including dyes can be added to the composition if desired.

The following experimental methods, materials, and results are described for purposes of illustrating the present invention. However, other aspects, advantages and modifications herein within the scope of the invention will be evident to those skilled in the art to which the invention pertains.

EXPERIMENTAL METHODOLOGY

The compositions of the invention are generally prepared by first preparing the ion pair salts of the selected fluorescent whitener agents and the quaternary surfactants. After preparation, the ion pair salts may be isolated or used as a dispersion. In a laboratory scale preparation, all ion pair salts were produced by mixing appropriate stoichiometric ratios of fluorescent whitener agents and cationic quaternary surfactants together in approximately 50 milliliter (ml) volumes. A slight excess of quaternary agent may be added to the fluorescent whitener agent in solution to avoid further isolation or preparation steps. To isolate the pure ion pair from the uncomplexed fluorescent whitener agents and surfactants, the resulting slurry was centrifuged, the liquid discarded and the solid then resuspended ultrasonically within a fresh aliquot of distilled water to produce a slurry. This cycle is repeated at least 5 times to remove salt and uncomplexed counterions. Most ion pairs were found to be white crystalline solids and had low solubilities in water, which made their isolation and recovery from the process efficient. Following the last of the five cycles, the recovered solid was freeze-dried and analyzed. Nuclear magnetic resonance was used to confirm that a representative ion pair produced in this manner was neutrally charged with a 1:2 complex of disulfonic derivatized anionic fluorescent whitener agent to cationic quaternary ammonium surfactant, respectively.

The methodology used to determine the stability of fluorescent whitener agents in sodium hypochlorite solutions is as follows:

A solution containing the desired amount of whitener agent was prepared in water and placed in a quartz cuvette containing a stir bar and rapidly mixed. The cuvette was then placed in a ultraviolet/visible spectrophotometer (a Perkin-Elmer LS-5) and the solution fluorescence intensity was measured at a fixed excitation and emission wavelength corresponding to the maximum wavelengths of response of the whitener agent measured. This initial intensity was used to normalize all subsequent fluorescence intensity readings on the percentage basis. To this same cuvette and solution were added an aliquot of liquid bleach, in sufficient volume to achieve the desired final level of sodium hypochlorite bleach in the mixed solutions. After the addition of the bleach at time zero (T=0), subsequent measurements of the solution fluorescence intensity are taken at various times.

The percentage of active whitener agent remaining in solution at any subsequent time is directly proportional to the solution fluorescence intensity at that time, divided by the initial solution intensity and multiplied by 100%. For measurements of stability at high sodium hypochlorite levels, the cuvette solution initially contains the appropriate level of sodium hypochlorite in water, and subsequently an aliquot of whitener agent solution is added at T=0, sufficient to achieve the desired initial level of whitener agent in the mixed solutions. The percentage of active whitener agent remaining in solution is calculated in the same manner as above. For very long time measurements, solutions were stored in the dark at room temperature, and aliquots were removed and the solution fluorescence intensity measured repeatedly over the desired time increment.

For measurements of whitener agent/sodium hypochlorite systems that were not optically transparent, aliquots of the same solutions removed at various times from a single stock solution were identically diluted in methanol to obtain the solution fluorescence intensity. All measurements of solution fluorescence intensity were standardized by comparison with a stable fluorescence standard.

Hypochlorite Bleach Resistance of Fluorescent Whitener Agent Ion-Pair Derivatives Tinopal CBS-X is generally considered to be a "bleach- stable" whitener. However, compositions exhibiting hypochlorite resistance are usually achieved either by using large amounts of whitener to form a colloidal dispersion or by emulsification of the fluorescent whitener agent with a protective coating of a bleach stable dispersant. At low concentrations and without protection, Tinopal CBS-X and other whiteners have fairly short survival times in the presence of hypochlorite ion. Determination of fluorescent whitener agent bleach resistance was conveniently monitored spectrophotometrically, since only active whitener emits fluorescence at a selected wavelength. This enables the kinetics of dilute systems to be monitored continuously in situ. By measuring the time required for the fluorescence intensity to decrease to half of its initial value, the characteristic half-life ($t_{½}$) of the material may be determined. The half-life in the presence of hypochlorite bleach is a convenient and relevant value that allows the survivability of different whiteners to be compared under similar conditions.

For screening purposes, fluorescent whitener agent concentrations were chosen between 2 to 4 micromolar (uM) to represent typical delivered wash levels and hypochlorite was diluted 1/250 (by volume) from a standard stock of 5.6% (weight percent of NaOCl) liquid bleach to yield 225 ppm sodium hypochlorite. The half-lives (time for the fluorescent whitener agent to be reduced to half its initial activity) of dilute Tinopal CBS-X and Tinopal 5-BMX in diluted bleach were found to be 255 and 125 seconds, respectively. Thus, under identical conditions, Tinopal CBS-X survive for approximately twice as long as does Tinopal 5-BMX The terminology used to represent the ion-pairs used in the following examples and tables are the following:

| Complex | Brightener | Quaternary Compound |
|---|---|---|
| IPC16 | Tinopal CBS-X | $C_{16}$ N-trimethylammonium |
| IPC18 | Tinopal CBS-X | $C_{18}$-N-trimethylammonium |
| IPB10 | Tinopal 5-BMX | $C_{10}$-N-trimethylammonium |
| IPB12 | Tinopal 5-BMX | $C_{12}$-N-trimethylammonium |
| IPB16 | Tinopal 5-BMX | $C_{16}$-N-trimethylammonium |
| IPR18 | Blankophor RKH | $C_{18}$-N-trimethylammonium |
| IPH18 | Blankophor BHC | $C_{18}$-*N-trimethylammonium* |

The hypochlorite stability of two ion-pairs was compared to CBS-X and its calcium salt, CaCBS. As seen in Table I, ion-pair IPC16 has a half-life nearly six times longer than the original whitener, while IPC18 was essentially stable to bleach during the course of the experiment with greater than 90% remaining in solution, in contrast to the original Tinopal CBS-X whitener, which was completely destroyed in the same 12-minute time period. By comparison, the hydrophobic CaCBS exhibited nearly identical decay times to those of Tinopal CBS-X itself. This indicated that the hydrophobic nature of the fluorescent whitener agent does not in itself solely account for the increased hypochlorite resistance. From solubility data, fluorescence emission data and the evaluation of light scattering results, it is evident that the ion-pairs are primarily in a monomeric form at the low concentrations used for the wash-level bleach screening tests (2 uM here).

It is possible that here or at slightly higher concentrations dimers, trimers and higher aggregates exist. However, the presence of these species would be evidenced spectroscopically, therefore if they do exist at the low concentrations used here, they would be present only in relatively small numbers—the majority of the whitener is probably present in the form of monomeric ion-pairs under the conditions used to compare wash-level hypochlorite bleach resistance.

In addition to Tinopal CBS-X derivatives, ion pairs of 5-BMX also show improved hypochlorite resistance, as seen in Table I. All ion-pairs investigated exhibited greater survival and higher half-lives than the original Tinopal 5-BMX whitener. Two compositions, IPB12 and IPB16, gave comparable performance to Tinopal CBS-X itself with half-lives of 250 seconds in dilute bleach solution. Table I also demonstrates the trend of increased hypochlorite survival with increasing quaternary counterion alkyl chain length. Table I summarizes the survival and half-lives of the various fluorescent whitener agent compositions tested. The ion-pair IPC12 exhibits unusual behavior in hypochlorite solution compared to the more stable IPC16 or IPC18 solutions. Results were observed to change with time, depending on the freshness of the diluted 2 uM solution. Light scattering results of more concentrated solutions indicate that the IPC12 complex tends to form an unstable flocculent, with its aggregates quickly growing in size until precipitation occurs. To follow IPC12 bleach resistance over time, a more concentrated solution (0.1 mM) in water was prepared by prolonged sonication (to break up aggregated structures) using the isolated IPC12 salt and aliquots were taken from this suspension at various intervals and diluted in water to the 2 uM level to be measured. The results in Table II show the relative hypochlorite resistance of IPC12 as a function of time following dilution. Initially, fresh IPC12 solution showed no increase in bleach resistance compared to Tinopal CBS-X whose solutions show no time dependent behavior). After aging for 15 and 30 minutes, however, the hypochlorite resistance of the dilute IPC12 solution increased markedly.

TABLE I

Survival of Various FWA's in Wash-Level Bleach Solution. Level of FWA remaining in solution after bleach addition at T = 0.

| FWA[1] | T = 0 | +3 mins | +6 mins | +9 mins | +12 mins | Half-life (Secs) |
|---|---|---|---|---|---|---|
| CBS-X | 100 | 78 | 51 | 38 | 23 | 255 |
| CaCBS | 100 | 79 | 57 | 49 | 22 | 280 |

TABLE I-continued

Survival of Various FWA's in Wash-Level Bleach Solution. Level of FWA remaining in solution after bleach addition at T = 0.

| FWA[1] | T = 0 | +3 mins | +6 mins | +9 mins | +12 mins | Half-life (Secs) |
|---|---|---|---|---|---|---|
| IPC16 | 100 | 70 | 68 | 64 | 61 | 1000 |
| IPC18 | 100 | 86 | 91 | 91 | 95 | >5000 |
| 5-BMX | 100 | 44 | 17 | 6 | 2 | 125 |
| IPB10 | 100 | 49 | 26 | 14 | 6 | 175 |
| IPB12 | 100 | 63 | 31 | 13 | 7 | 250 |
| IPB16 | 100 | 59 | 43 | 36 | 31 | 250 |

[1]FWA concentration for each solution is 2 micromolar. Sodium hypochlorite is 225 ppm corresponding to a 1/250 (v/v) dilution of liquid bleach (analyzed to 5.6 w % NaOCl) added to FWA solution in water at T = 0. These conditions represent typical wash levels of both components. Solution fluorescence was monitored to determine amount of active FWA present in solution as a function of time. Data is normalized to 100% at start of experiment. Conditions were identical for all samples within a set.

TALBLE II

Survival of IPC12 Ion Pair in Wash-Level Bleach Solution at Various Times Following Preparation

| Age of IPC12 Solution[1] | T = 0 | +3 min | +6 min | +9 min | +12 min | Half-life (Secs) |
|---|---|---|---|---|---|---|
| Fresh | 100 | 26 | 6 | 3 | 3 | 60 |
| 15 mins old | 100 | 46 | 27 | 12 | 7 | 150 |
| 30 mins old | 100 | 80 | 75 | 63 | 56 | 720 |

[1]IPC12 is the ion pair of Tinopal CBS-X and $C_{12}$ N-trimethyl quaternary ammonium ion. Concentration for each solution is 2 micromolar. Fresh stock solution of 0.1 millimolar IPC12 was prepared and sonicated extensively to disrupt all aggregated material. Stock solution was then allowed to age, and aliquots were removed and diluted to 1 micromolar concentration at times indicated. Sodium hypochlorite was 225 ppm corresponding to a 1/250 (v/v) dilution of liquid bleach (analyzed to 5.6 wt. % NaOCl) added to fluorescent whitener agent solution in water at T = 0. Solution fluorescence was monitored to determine amount of active fluorescent whitener agent present in solution as a function of time. Data is normalized to 100% at start of experiment. Measurement conditions were identical for all samples.

The following Tables III and IV represent stability of fluorescent whitener additive at intermediate and concentrated levels and hypochlorite bleach at high concentrations.

TABLE III

Fluorescent Whitener Agent in Concentrated Hypochlorite Bleach Intermediate Fluorescent Whitener Agent Concentration

| FWA | [FWA][1] (ppm) | [NaOCl][2] (weight %) | Normalized FWA Activity[3] T = O[4] | +0.5 Hr | +1 Hr | +2 Hr | +3 Hr |
|---|---|---|---|---|---|---|---|
| CBS-X | 143 | 4.7 | 100 | 46.6 | 16.2 | 4.0 | 2.0 |
| IPC18 | 143 | 4.7 | 100 | 103.3[5] | 90.6 | 77.9 | 1.6 |
| RKH | 143 | 4.7 | 0[6] | 0 | 0 | 0 | — |
| IPR18 | 143 | 4.7 | 100 | 58.7 | 35.2 | 22.4 | 6.6 |
| BHC | 143 | 4.7 | 100 | 17.5 | 14.0 | 10.9 | 4.4 |
| IPH18 | 143 | 4.7 | 100 | 120.0[5] | 138.4 | 122.8 | 96.6 |

[1]Prepared from 1000 ppm dispersed fluorescent whitener agent solution.
[2]Prepared from 5.44% (weight % NaOCl) liquid bleach.
[3]Measured using solution fluorescence activity. Ex = 350/EM = 435, slits 3/3 nm, Scale = 1.00.
[4]Fluorescent whitener agent added to bleach, shaken and placed in cuvette at T = O. No further mixing of solutions in cuvettes.
[5]Increase in fluorescence above starting level is due to dissolution of some dispersed fluorescent whitener agent into solution.
[6]Discolored slightly upon addition of bleach.

TABLE IV

Fluorescent Whitener Agent Stability in Concentration Hypochlorite Bleach High Fluorescent Whitener Agent Solution

| FWA | [FWA][1] (ppm) | [NaOCl][2] (weight %) | Normalized FWA Activity[3] T = O[4] | +18 Hr | +48 Hr | +120 Hr | +216 Hr |
|---|---|---|---|---|---|---|---|
| CBS-X | 1000 | 4.35 | 100 | 10.7 | 2.1 | — | — |
| IPC18 | 1000 | 4.35 | 100 | 19.5 | 1.7 | — | — |
| RKH | 1000 | 4.35 | 0[5] | 0 | 0 | — | — |
| IPR18 | 1000 | 4.35 | 100 | 10.1 | 1.0 | — | — |

TABLE IV-continued

Fluorescent Whitener Agent Stability in Concentration Hypochlorite Bleach High Fluorescent Whitener Agent Solution

| FWA | [FWA][1] (ppm) | [NaOCl][2] (weight %) | Normalized FWA Activity[3] T = O[4] | +18 Hr | +48 Hr | +120 Hr | +216 Hr |
|---|---|---|---|---|---|---|---|
| BHC | 1000 | 4.35 | 100 | 25.8 | — | 21.4 | 12.7 |
| IPH18 | 1000 | 4.35 | 100[6] | 106.8 | 106.8 | 183.6 | 14.6 |

[1]Prepared from 1000 ppm dispersed fluorescent agent whitener solution.
[2]Prepared from 5.44% (weight % NaOCl) liquid bleach.
[3]Measured using solution fluorescence activity. EX = 350/EM = 435, slits 3/3 nm, Scale = 1.00.
[4]Fluorescent whitener agent added to bleach, shaken and placed in cuvette at T = O. No further mixing of solutions in cuvettes.
[5]Discolored upon addition of bleach.
[6]Increase in fluorescence above starting level is due to dissolution of some dispersed fluorescent whitener agent into solution.

Fluorescent whitener agents ion-paired with quaternary surfactants generally survived better than the original fluorescent whitener agents in systems containing whitener and bleach both at delivered wash concentrations. In concentrated hypochlorite it is difficult to assess active labels due to the tendency of fluorescent whitener agents to precipitate from solution at higher ionic strengths. Although he fluorescent whitener agents did precipitate in this study, aliquots were solubilized with methanol prior to measuring their fluorescence activity. The measurements reported were performed in concentrated hypochlorite solution (4.4–4.7% NaOCl) at intermediate (143 ppm) and high (1000 ppm) whitener levels. Fluorescence measurements were employed to determine the level of active fluorescent whitener agent present in the solutions at various times following preparation. Results in Tables III and IV are for three whitener systems: CBS-X, RKH and BHC and their octadecyl (18 carbon) quarternary ammonium ion-pairs, designated as IPX18, where C=CBS, R=RKH and H=BHC.

In summary, at intermediate fluorescent whitener agent levels: ion pairs IPC18, IPR18 and IPH18 performed better than their original fluorescent whitener agents, CBS-X, RKH and BHC, respectively; RKH discolored upon addition to bleach; and IPH18 showed a potential for long term stability.

At high fluorescent whitener agent levels: all ion-pairs performed better than their respective fluorescent whitener agents; CBS-X and RKH, and their ion-pairs, showed poor long term stability; IPH18 showed very high stability from 0 to 120 hours; after 200 hours, both fluorescent whitener agents CBS-X and RKH were reduced to low activity. The effective hypochlorite level at 200 hours was not reduced significantly by fluorescent agent interaction.

Ion-paired compositions generally showed better chemical stability than their original fluorescent whitener agents in concentrated bleach. As tested, the systems all had poor physical stability and tended to settle quickly. However, with a suitable suspension technology, selected ion-paired fluorescent whitener agents look very promising as candidates for concentrated bleach with whitener products.

Without being bound to any specific theory, it would appear from these results that two mechanisms for hypochlorite resistance are operative:

(1) The monomer-form of the ion-pair shows bleach resistance which increases with greater counterion alkyl chain length. Therefore, the alkyl chains of the quaternary surfactant counterions probably associate with the fluorescent whitener agent or whitener to reduce the total hydrophobic repulsion between the ion-pair and the surrounding aqueous solvent, and as a consequence of their steric hindrance help protect the fluorescent whitener agent from hypochlorite attack. This is supported with the longer alkyl chain quaternary amine imparting the greater degree of bleach resistance to the ion-paired complex;

(2) At higher concentrations a second probable mechanism to account for additional bleach resistance is the formation of aggregates (dimers, trimers, . . . etc.) and larger suspended crystallites (very large aggregates). Since the ratio of total particle surface area to volume decreases with increasing particle size, the larger aggregates would presumably be able to "shelter" a correspondingly greater amount of active material from contact with the hypochlorite in the solution. Thus, the average half-life of the ion-pair in the presence of hypochlorite solution should increase with aggregate size, as is observed. In the presence of bleach, monomers and smaller aggregates would still be the most prone to hypochlorite attack and would eventually be destroyed. Thus, while the concentration of monomer and the distribution of aggregate sizes is probably changing unpredictably during the course of the measurement in bleach, it is a reasonable assumption that the observed increased stability with increased aging time as observed for IBP12 for instance would be due to a growing number of larger aggregates. Light scattering is observed to increase in intensity as a function of time indicating the formation of more and larger aggregates. In contrast, initially IPC16 and IPC18 form more stable (smaller aggregate size) suspensions and exhibit little time dependence of their light scattering and their bleach resistance following preparation.

The exact mechanism for the unusual stability and better dispersibility of the longer chained quaternary amine complexes is not clear, although some speculation is possible. Various theories, either steric or electronic, can be advanced for the observed stability of the ion pairs.

These observed results suggest that ion-pair fluorescent whitener agent compositions are suitable candidates as whiteners in hypochlorite-containing systems since they possess much higher monomer stabilities, and in addition, spontaneously aggregate at low concentrations to form dispersions with further increased hypochlorite resistance.

Detergent Formulations and Adjuncts Therefore

The standard detergent adjuncts can be included in the present invention. In another embodiment, these adjuncts are included in the detergent formulations which also contain the fluorescent whitener agents described herein. The detergent compositions comprise an effective amount of at least one surfactant selected from the group consisting of anionic, nonionic, cationic, amphoteric, zwitterionic surfactants, and mixtures thereof; a matrix carrier therefore comprising inorganic salts, water-soluble or dispersible organic solvents, water or mixtures thereof; and at least one adjunct selected from the group: anti-oxidants, enzymes, enzyme stabilizers, dyes, pigments, foam boosters, anti-foaming agents, buffers, chelating agents, thickeners, fragrances, builders and mixtures thereof.

These include dyes, such as Monastral blue and anthraquinone dyes (such as those described in Zielske, U.S. Pat. Nos. 4,661,293 and 4,746,461). Pigments, which are also suitable colorants, can be selected, without limitation, from titanium dioxide, ultramarine blue (see also, Chang et al., U.S. Pat. No. 4,708,816) and colored aluminosilicates.

Anti-redeposition agents, such as carboxymethylcellulose, are potentially desirable. Foam boosters, such as appropriate anionic surfactants, may be appropriate for inclusion herein. Also, in the case of excess foaming resulting from the use of certain nonionic surfactants, anti-foaming agents, such as alkylated polysiloxanes, e.g., dimethyl polysiloxane would be desirable. Also, certain solvents, such as glycol, e.gs., propylene glycol, and ethylene glycol, certain alcohols, such as ethanol or propanol, and hydrocarbons, such as paraffin oil, e.g., Isopar K from Exxon U.S.A., may be useful to thin liquid compositions. Buffers may also be suitable for use, such as sodium hydroxide, sodium borate, sodium bicarbonate, to maintain a more alkaline pH in aqueous solution, and acids, such as hydrochloric acid, sulfuric acid, citric acid and boric acid, would be suitable for maintaining or adjusting to a more acidic pH.

In case the liquid composition is too thin, some thickeners such as gums (xanthan gum and guar gum) and various resins (e.g., polyvinyl alcohol, and polyvinyl pyrrolidone) may be suitable for use. Fragrances are also desirable adjuncts in these solid or liquid compositions.

The additives may be present in amounts ranging from 0–50%, more preferably 0–40%, and most preferably 0–20%. In certain cases, some of the individual adjuncts may overlap in other categories. For example, some buffers, such as silicates may also be builders. Also, some surface active esters may actually function to a limited extent as surfactants. However, the present invention contemplates each of the adjuncts as providing discrete performance benefits in their various categories.

The builders are typically alkaline builders, i.e., those which in aqueous solution will attain a pH of 7–14, preferably 9–12. Examples of inorganic builders include the alkali metal and ammonium carbonates (including sesquicarbonates and bicarbonates), silicates (including polysilicates and metasilicates), phosphates (including orthophosphates, tripolyphosphates and tetrapyrophosphates), alumino silicates (both natural and synthetic zeolites), and mixtures thereof. Carbonates are especially desirable for use in this invention because of their high alkalinity and effectiveness in sequestering alkali and metal ions which may be present in hard water, as well as their low cost.

Organic builders are also suitable for use, and are selected from the group consisting of the alkali metal and ammonium sulfosuccinates, polyacrylates, polymaleates, copolymers of acrylic acid and maleic acid or maleic anhydride, nitrilotriacetic acid, ethylenediaminetetraacetic acid, citrates and mixtures thereof.

While the invention has been described in connection with specific embodiments thereof, it will be understood that it is capable of further modifications, and this application is intended to cover any variations, uses or adaptions of the invention following, in general, the principles of the invention and including such departures from the present disclosure as come within known or customary practice in the art to which the invention pertains and as may be applied to the essential features hereinbefore set forth, as fall within the scope of the invention and the limits of the appended claims.

Although the above description and the claims appended hereto describe methods and compositions useful as household bleaches, laundry additives and detergents, variations and modifications thereof which are within the spirit and scope of this application will become evident to those skilled in the art to which this invention pertains.

What is claimed is:

1. A fluorescent whitener agent composition stable to aqueous hypochlorite bleach comprising:

(a) a fluorescent whitener agent selected from the group consisting of a mono- or polysulfonated distyryl-biphenyl or the salts thereof; a mono- or polysulfonated triazinyl amino stilbene or the salts thereof; a mono- or polysulfonated triazoyl stilbene or the salts thereof; a mono- or polysulfonated naphthotriazolyl or salts thereof; or combinations thereof; and (b) an N-higher alkyl, N,N,N-lower alkylammonium ion; wherein the N-higher alkyl, N,N,N-lower alkylammonium ion and fluorescent whitener agent are present in an ion-pair in at least a stoichiometric ratio-- based on the fluorescent whitener agent.

2. The method of imparting aqueous hypochlorite bleach stability to a fluorescent whitener agent which comprises forming an ion-pair with the fluorescent whitener agent by reacting at least a stoichiometric amount of an N-higher alkyl, N,N,N-lower alkylammonium ion-producing compound with a mono- a fluorescent whitener agent selected from the group consisting of or polysulfonated distyryl-biphenyl or the salts thereof; a mono- or polysulfonated triazinyl amino stilbene or the salts thereof; a mono- or polysulfonated triazolylstilbene or the salts thereof; a mono- or polysulfonated stilbenyl- naphthotriazole or the salts thereof; or combinations thereof wherein the N-higher alkyl, N,N,N-lower alkylammonium ion-producing compound and fluorescent whitener agent are present in the ion-pair in at least a-stoichiometric ratio based on the fluorescent whitener agent.

3. A fluorescent whitener agent composition stable to aqueous hypochlorite bleach comprising:

(a) from about 0.001% to about 20% sodium hypochlorite;

(b) from about 0.001% to about 5.0% hypochlorite bleach compatible ion-pair comprising a (i) a fluorescent whitener agent selected from the group consisting of a mono- or polysulfonated distyryl-biphenyl or the salts thereof; a mono- or polysulfonated phenyltriazinyl amino stilbene or the salts thereof; a mono- or polysulfonated triazoyl stilbene or the salts thereof; a mono- or polysulfonated naphthotriazolyl or salts thereof; or combinations thereof; and (ii) an N-higher alkyl, N,N,N-lower alkylammonium ion-producing compound and fluorescent whitener agent present in at least a stoichiometric ration based on the fluorescent whitener agent; and (c) an amount of water sufficient to make 100%.

4. An aqueous hypochlorite bleach stabilized fluorescent whitener agent composition of claim 3 additionally comprising 0–50% of an adjunct material selected from dyes, pigments, anti-redeposition agents, foam builders, defoaming agents, stabilizers, thickeners, fragrances, and mixtures thereof, which is stable against chemical attack by hypochlorite.

5. The aqueous hypochlorite bleach stabilized fluorescent whitener agent composition of claims 3 or 4 wherein said N-higher alkyl, N,N,N-lower alkylammonium ion-producing compound has the following structure:

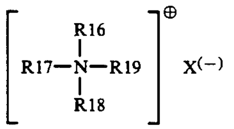

wherein at least one of R16, R17, R18 and R19 is selected from $C_8$–$C_{18}$ saturated alkyl groups and the remainder of R16, R17, R18 and R19 are independently selected from the group consisting of $C_1$–$C_4$-saturated alkyl, hydrogen and phenyl and $X^-$ is a water-soluble salt-forming anion selected from the group consisting of $Cl^-$, $Br^-$, $OH^-$, $CN^-$ and $F^-$; and wherein the mono- or polysulfonated distyryl-biphenyl or the salts thereof have the following structure

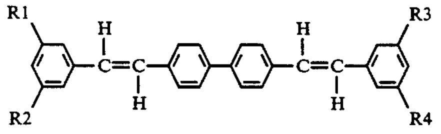

wherein R1, R2, R3 and R4 are independently selected from the group consisting of R=—H, —$SO_3H$, —$SO_3^-M^+$, —$OCH_3$, —CN, —Cl,

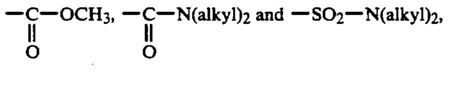

wherein the alkyl group contains from 1 to 8 carbon atoms; provided that at least one of R1, R2 R3 or R4 is —$SO_3H$, —$SO_2$—N(alkyl)$_2$ and where M=H, Na, K or Li.

6. The composition of claim 5 wherein said polysulfonated distyryl-biphenyl is 4,4'-distyryl biphenyl disulfonic acid or salts thereof and the alkylammonium ion-producing compound is-N-$C_8$ saturated alkyl,N,N,N-trimethylammonium.

7. The aqueous hypochlorite bleach stabilized fluorescent whitener agent composition of claims 3 or 4 wherein said N-higher, N,N,N-lower alkylammonium ion-producing compound has the following structure:

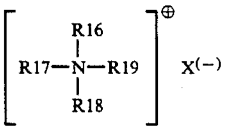

wherein at least one of R16, R17, R18 and R19 is selected from $C_8$–$C_{18}$ saturated alkyl groups and the remainder of R16, R17, R18 and R19 is selected from the group consisting of $C_1$–$C_4$ saturated alkyl, hydrogen and phenyl, and $X^-$ is a water- soluble salt-forming anion selected from the group consisting of $Cl^-$, $Br^-$, $OH^-$, $CN^-$ and $F^-$; and wherein the mono- or polysulfonated triazinyl amino stilbene or the salts thereof have the following structure

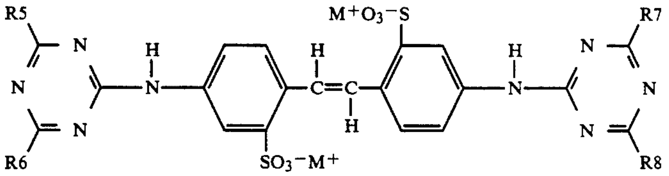

wherein M is H, Na, K or Li; and each of R5, R6, R7 and R8 are independently selected from the group consisting of

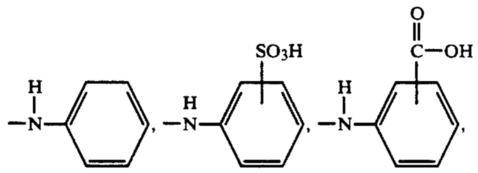

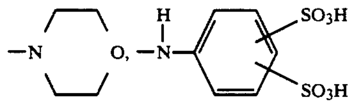

—NH—$(CH_2)_{2\text{-}3}$—$OCH_3$,

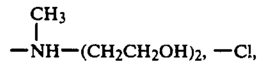

—NH—$CH_2$—$CH_2$—OH, —N(alkyl)$_2$ and —NH-alkyl wherein the alkyl group contains from 1 to 8 carbon atoms, —$NH_2$, —NH—$CH_2$—$CH_2$—$SO_3H$, —NH—$CH_2$—$CH_2$—OH, and —$OCH_3$.

8. The aqueous hypochlorite bleach stabilized fluorescent whitener agent composition of claims 3 or 4 wherein said N-higher, N,N,N-lower alkylammonium ion-producing compound has the following structure:

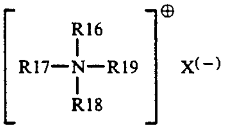

wherein at least one of R16, R17, R18 and R19 is selected from $C_8$–$C_{18}$ saturated alkyl groups and the remainder of R16, R17, R18 and R19 is selected from the group consisting of $C_1$–$C_4$ saturated alkyl, hydrogen and phenyl, provided at least three of R16, R17 and R18 are methyl, ethyl or propyl, and $X^-$ is a water-soluble salt-forming anion selected from the group consisting of $Cl^-$, $Br^-$, $OH^-$, $CN^-$ and $F^-$; and wherein the mono- or polysulfonated triazolyl stilbene or the salts thereof have the following structure

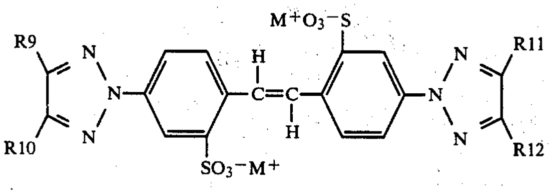

wherein M is H, Na, K or Li; and each of R9, R10, R11 and R12 are independently selected from the substituents —H, —Cl, —NH—$CH_3$, —$N(CH_3)_2$, —$SO_3H$, —$SO_2$—$NH_2$, —$SO_3^-M^+$, —$C_6H_5$, —$SO_2$—O—$C_6H_5$, —$OCH_3$, —CN, and —$SO_2$—N(alkyl)$_2$ and

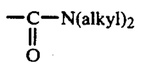

wherein the alkyl group contains from 1 to 8 carbon atoms.

9. The composition of claim 8 wherein the polysulfonated triazolyl stilbene is 4,4'-bis(triazo-2-yl)-stilbene-2,2'-disulfonic acid or the salts thereof and the alkyl ammonium ion-producing compound is N-$C_{16}$-alkyl,N,N,N-trimethylammonium.

10. The aqueous hypochlorite bleach stabilized fluorescent whitener agent composition of claims 3 or 4 wherein said N-higher, N,N,N-lower alkylammonium ion-producing compound has the following structure:

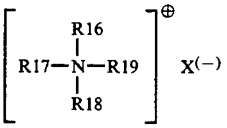

wherein at least one of R16, R17, R18 and R19 is selected from $C_8$–$C_{18}$ saturated alkyl groups and the remainder of R16, R17, R18 and R19 is selected from the group consisting of $C_1$–$C_4$ saturated alkyl, hydrogen and phenyl, and $X^-$ is a water-soluble salt-forming anion selected from the group consisting of $Cl^-$, $Br^-$, $OH^-$, $CN^-$ and $F^-$; and wherein the mono- or polysulfonated stilbenyl-naphthotriazole or the salts thereof have the following structure

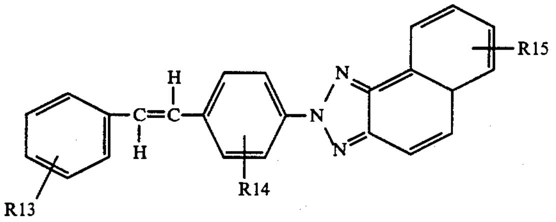

wherein R13, R14 and R15 are independently selected from the substituents —H, —$SO_3H$, —$SO_3^-M^+$, —CN, —Cl, —$OCH_3$, —NH—$CH_3$, —$N(CH_3)_2$, —N-(alkyl)$_2$, —$SO_2$—$NH_2$, —$SO_2$—O—$C_6H_5$,

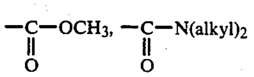

and —$SO_2$—M(alkyl)$_2$ wherein the alkyl group contains from 1 to 8 carbon atoms, and wherein M is H, Na, K or Li; and combinations thereof, provided that at least one of R13, R14 or R15 is —$SO_3^-M^+$.

11. The composition of claims 3 or 4 wherein the amount of said ion-pair fluorescent whitener agent is from about 0.01% to about 1.0%.

12. The composition of claims 3 or 4 wherein the amount of said ion-pair fluorescent whitener agent is from about 0.01% to about 0.1%.

13. A detergent composition comprising:
(a) a solid or liquid material which comprises an effective amount of at least one surfactant selected from the group consisting of anionic, nonionic, cationic, amphoteric, zwitterionic surfactants, and mixtures thereof;
(b) an alkaline builder;
(c) at least one adjunct selected from the group anti-oxidants, enzymes, enzyme stabilizers, dyes, pigments, foam boosters, anti-foaming agents, buffers, chelating agents, bleach activators, oxidant stabilizers, thickeners, fragrances, builders and mixtures thereof;
(d) an aqueous hypochlorite bleach compatible ion-pair comprising a
(i) a fluorescent whitener agent selected from the group consisting of a mono- or poly-sulfonated distyryl-biphenyl or the salts thereof; a mono- or poly-sulfonated phenyltriazinyl amino stilbene or the salts thereof; a mono- or poly-sulfonated triazoyl stilbene or the salts thereof; a mono- or poly-sulfonated naphthotriazolyl or salts thereof; or combinations thereof; and
(ii) an N-higher alkyl, N,N,N-lower alkylammonium ion-producing compound and fluorescent whitener agent present in at least a stoichiometric ration based on the fluorescent whitener agent; and (e) an amount of an aqueous carrier therefore.

14. A detergent composition according to claim 13 which comprises by weight percent:
(a) 20–90% of a solid or liquid matrix which comprises an effective amount of at least one surfactant;
(b) 0–50% of a builder;
(c) 0–20% of at least one adjunct selected from the group anti-oxidant, enzymes, enzyme stabilizers, dyes, pigments, foam boosters, anti-foaming agents, buffers, chelating agents, bleach activators, oxidant stabilizers, thickeners, fragrances, and mixtures thereof;
(d) from about 0.001% to about 5.0% of said hypochlorite bleach compatible ion pair fluorescent whitener agent.

* * * * *

UNITED STATES PATENT AND TRADEMARK OFFICE
CERTIFICATE OF CORRECTION

PATENT NO. : 5,057,236

DATED : October 15, 1991

INVENTOR(S) : Michael Petrin et al.

It is certified that error appears in the above-identified patent and that said Letters Patent is hereby corrected as shown below:

In column 2, at line 55, the word "formula&ed" should read --- formulated ---.

In column 3, word bridging lines 3 & 4 should read --- whitener ---.

Signed and Sealed this

Thirtieth Day of March, 1993

*Attest:*

STEPHEN G. KUNIN

*Attesting Officer* *Acting Commissioner of Patents and Trademarks*